United States Patent [19]

Farnworth

[11] Patent Number: 5,484,314

[45] Date of Patent: Jan. 16, 1996

[54] MICRO-PILLAR FABRICATION UTILIZING A STEREOLITHOGRAPHIC PRINTING PROCESS

[75] Inventor: Warren M. Farnworth, Boise, Id.

[73] Assignee: Micron Semiconductor, Inc., Boise, Id.

[21] Appl. No.: 322,903

[22] Filed: Oct. 13, 1994

[51] Int. Cl.$^6$ .................................................. H01J 9/18
[52] U.S. Cl. ....................................................... 445/24
[58] Field of Search ........................................ 445/24, 25

[56] References Cited

U.S. PATENT DOCUMENTS

| | | | |
|---|---|---|---|
| 3,843,427 | 10/1974 | Van Esdonk et al. | 156/3 |
| 3,953,756 | 4/1976 | Mondroy et al. | 313/220 |
| 4,091,305 | 5/1978 | Poley et al. | 313/5486 |
| 4,183,125 | 1/1980 | Meyer et al. | 445/24 |
| 4,292,092 | 9/1981 | Hanak | 148/1.5 |
| 4,422,731 | 12/1983 | Droguet et al. | 350/344 |
| 4,451,759 | 5/1984 | Heynisch | 313/495 |
| 4,749,840 | 6/1988 | Piwexyk | 219/121 |
| 4,874,461 | 10/1989 | Sato et al. | 156/633 |
| 4,892,592 | 12/1989 | Dickson et al. | 136/244 |
| 4,923,421 | 5/1990 | Brodie et al. | 445/24 |
| 4,973,378 | 11/1990 | Lee et al. | 156/633 |
| 5,011,391 | 4/1991 | Kawasaki et al. | 445/24 |
| 5,083,958 | 1/1992 | Longo et al. | 445/24 |
| 5,129,850 | 7/1992 | Kane et al. | 445/24 |
| 5,205,770 | 4/1993 | Lowrey et al. | 445/24 |
| 5,232,549 | 8/1993 | Cathey et al. | 456/633 |

FOREIGN PATENT DOCUMENTS

| | | | |
|---|---|---|---|
| 60-49626 | 3/1985 | Japan | H01L 21/30 |
| 1-220330 | 2/1988 | Japan | H01J 9/02 |
| 2-165540 | 12/1988 | Japan | H01J 9/24 |
| 3-179630 | 8/1991 | Japan | H01J 9/02 |

OTHER PUBLICATIONS

3D Systems Spec. Sheet for SLA–250 Series 40.

Yoshitaka Terao et al., "Fabrication of Fine Barrier Ribs for Color Plasma Display Panels by Sandblasting", *Oki Electric Industry Co., Ltd. *Research Laboratory, **Electronic Devices Section, pp. 1–7.

Chris Curtin, "The Field Emission Display: A New Flat Panel Technology", *IEEE,* 1991, pp. 12–15.

N. C. Jaitly, T. S. Sudarshan, "Novel Insulator Designs For Superior DC Hold–Off In Bridged Vacuum Gaps", *IEEE Transactions on Electrical Insulation,* vol. EI–22 No. 6, Dec. 1987, pp. 801–810.

R. Meyer, "LP 09 6"Diagonal Microtips Fluorescent Display For T.V. Applications", International Display Research Conference, 1990.

A. Ghis, R. Meyer, P. Rambaud, F. Levy, T. Leroux, "Sealed Vaccum Devices: Fluorescent Microtip Displays", IEEE Transactions On Electron Devices, vol. 38, No. 10, Oct. 1991, pp. 2320–2322.

S. Sakamoto, K. Kato, "A Screen–printing Process for the Fabrication of Plasma Display Panels", Kyushu Noritake Co., Ltd., Asakura, Fukuika, Japan, pp. 127–130.

*Primary Examiner*—Kenneth J. Ramsey
*Attorney, Agent, or Firm*—Lia M. Pappas

[57] ABSTRACT

Another aspect of the present invention comprises a method for fabricating columnar supports used for an evacuated display, in which an electrode plate is covered with a layer of material having a depth. The material is used to form the columnar supports, and the depth of the layer represents the height of the columnar supports. The material is selectively irradiated with light energy in a pattern causing the material to harden, thereby forming the columnar supports.

20 Claims, 2 Drawing Sheets

MICRO-PILLAR FABRICATION UTILIZING A STEREOLITHOGRAPHIC PRINTING PROCESS

FIELD OF THE INVENTION

This invention relates to field emission devices, and more particularly to processes for creating the spacer structures which can provide support against the atmospheric pressure on the flat panel display without impairing the resolution of the image.

BACKGROUND OF THE INVENTION

It is important in flat panel displays of the field emission cathode type that an evacuated cavity be maintained between the cathode electron emitting surface and its corresponding anode display face (also referred to as an anode, cathodoluminescent screen, display screen, faceplate, or display electrode).

There is a relatively high voltage differential (e.g., generally above 200 volts) between the cathode emitting surface (also referred to as base electrode, baseplate, emitter surface, cathode surface) and the display screen. It is important that electrical breakdown between the electron emitting surface and the anode display face be prevented. At the same time, the narrow spacing between the plates is necessary to maintain the desired structural thinness and to obtain high image resolution.

The spacing also has to be uniform for consistent image resolution, and brightness, as well as to avoid display distortion, etc. Uneven spacing is much more likely to occur in a field emission cathode, matrix addressed flat vacuum type display than in some other display types because of the high pressure differential that exists between external atmospheric pressure and the pressure within the evacuated chamber between the baseplate and the faceplate. The pressure in the evacuated chamber is typically less than $10^{-6}$ torr.

Small area displays (e.g., those which are approximately 1" diagonal) do not require spacers, since glass having a thickness of approximately 0.040" can support the atmospheric load, but as the display area increases, spacer supports become more important. For example, a screen having a 30" diagonal measurement will have several tones of atmospheric force exerted upon it. As a result of this tremendous pressure, spacers will play an essential role in the structure of the large area, light weight, displays.

Spacers are incorporated between the display faceplate and the baseplate upon which the emitter tips are fabricated. The spacers, in conjunction with thin, lightweight, substrates support the atmospheric pressure, allowing the display area to be increased with little or no increase in substrate thickness.

Spacer structures must conform to certain parameters. The supports must 1) be sufficiently non-conductive to prevent electrical breakdown between the cathode array and the anode, in spite of the relatively close inter-electrode spacing (which may be on the order of 100 microns), and relatively high inter-electrode voltage differential (which may be on the order of 200 or more volts); 2) exhibit mechanical strength such that they exhibit only slow deformation over time to provide the flat panel display with an appreciable useful life; 3) exhibit stability under electron bombardment, since electrons will be generated at each of the pixels; 4) be capable of withstanding "bakeout" temperatures of around 400° C. that are required to create the high vacuum between the faceplate and backplate of the display; and 5) be of small enough size so as to not to visibly interfere with display operation.

There are several drawbacks to the current spacers and methods. One disadvantage is need for the spacer supports to be relatively large, having diameters in the range of 50 microns, in order to render innocuous the small amount of isotropic distortion (i.e., undercutting of the spacers) that inevitably occurs during anisotropic (plasma) etches. In other words, if the spacers are too narrow, they will tend to bend slightly during the long etching process which is used to eliminate the material surrounding the spacer.

Those known processes which involve the use of attaching and aligning pre-made spacers to the electrodes tend to be very unreliable, tedious and expensive.

SUMMARY OF THE INVENTION

The process of the present invention uses stereolithographic printing techniques to build micro-sized pillars for use in flat panel displays. The process of the present invention is a quick and efficient process which enables the manufacture of very small, and accurately aligned spacer structures, useful in evacuated displays.

One aspect of the present invention comprises a method for fabricating micro-pillars useful in evacuated displays, in which a baseplate is disposed in a bath containing support material. The support material covers the top surface of the baseplate. Radiant energy is pulsed toward the top surface of the baseplate in a pattern, and hardens the support material impacted thereby.

Another aspect of the present invention comprises a method for fabricating columnar supports used for an evacuated display, in which an electrode plate is covered with a layer of material having a depth. The material is used to form the columnar supports, and the depth of the layer represents the height of the columnar supports. The material is selectively irradiated with light energy in a pattern causing the material to harden, thereby forming the columnar supports.

A further aspect of the present invention comprises a method of forming inter-electrode spacers useful for flat panel display devices. The method involves placing a display electrode on a pedestal, which pedestal is disposed in a vat of glass beads. A layer of glass beads blankets the display electrode. Laser energy is directed toward the display electrode, and the glass beads adhering to the baseplate as a result of the laser energy.

BRIEF DESCRIPTION OF THE DRAWING

The present invention will be better understood from reading the following description of nonlimitative embodiments, with reference to the attached drawings, wherein below.

It should be emphasized that the drawings of the instant application are not to scale but are merely schematic representations and are not intended to portray the specific parameters or the structural details of a flat panel display which are well known in the art.

DETAILED DESCRIPTION OF THE INVENTION

Figure 1:
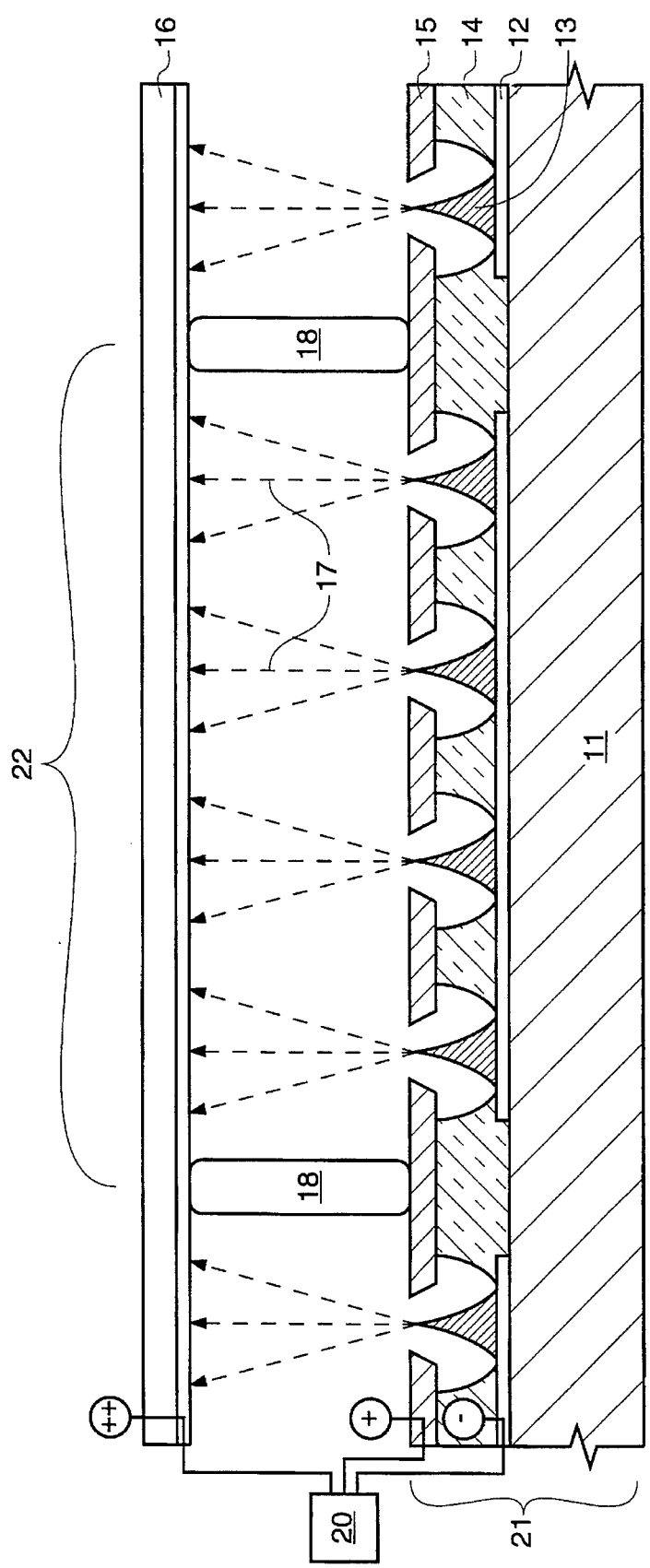
FIG. 1 is a schematic cross-section of a representative pixel of a field emission display comprising a faceplate with a phosphor screen, vacuum sealed to a baseplate which is supported by the spacers formed according to the process of the present invention.

Referring to FIG. 1, a representative field emission display employing a display segment 22 is depicted. Each display segment 22 is capable of displaying a pixel of information, or a portion of a pixel, as, for example, one green dot of a red/green/blue full-color triad pixel.

Preferably, a single crystal silicon layer serves as a substrate 11. Alternatively, amorphous silicon deposited on an underlying substrate comprised largely of glass or other combination may be used as long as a material capable of conducting electrical current is present on the surface of a substrate so that it can be patterned and etched to form micro-cathodes 13.

At a field emission site, a micro-cathode 13 has been constructed on top of the substrate 11. The micro-cathode 13 is a protuberance which may have a variety of shapes, such as pyramidal, conical, or other geometry which has a fine micro-point for the emission of electrons. Surrounding the micro-cathode 13, is a grid structure 15. When a voltage differential, through source 20, is applied between the cathode 13 and the grid 15, a stream of electrons 17 is emitted toward a phosphor coated screen 16. Screen 16 is an anode.

The electron emission tip 13 is integral with substrate 11, and serves as a cathode. Gate 15 serves as a grid structure for applying an electrical field potential to its respective cathode 13.

A dielectric insulating layer 14 is deposited on the conductive cathode 13, which cathode 13 can be formed from the substrate or from one or more deposited conductive films, such as a chromium amorphous silicon bilayer. The insulator 14 also has an opening at the field emission site location.

Disposed between said faceplate 16 and said baseplate 21 are located spacer support structures 18 which function to support the atmospheric pressure which exists on the electrode faceplate 16 as a result of the vacuum which is created between the baseplate 21 and faceplate 16 for the proper functioning of the emitter tips 13.

The baseplate 21 of the invention comprises a matrix addressable array of cold cathode emission structures 13, the substrate 11 on which the emission structures 13 are created, the insulating layer 14, and the anode grid 15.

Figure 2:
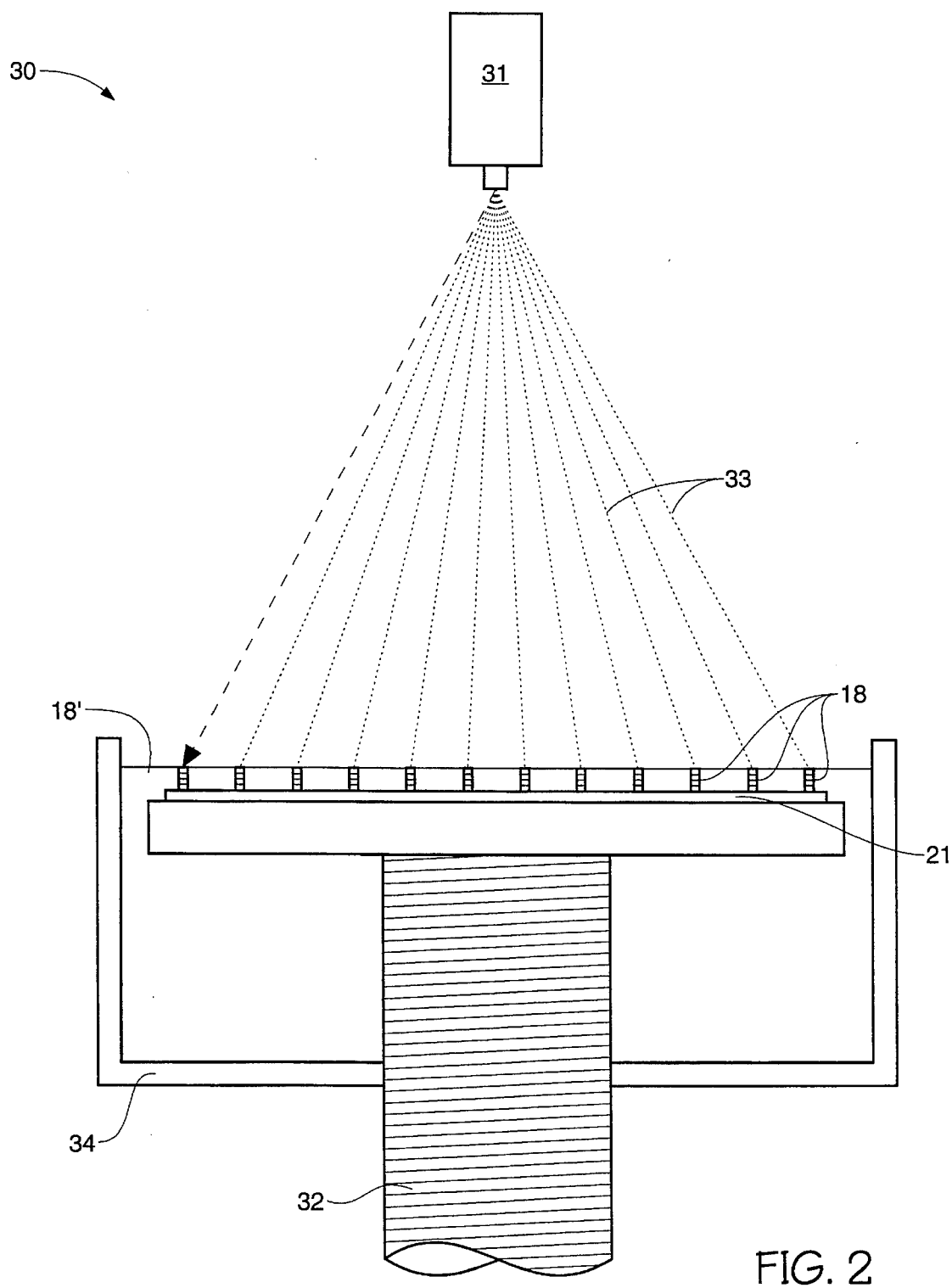
FIG. 2 is a schematic representation of the method of forming micro-pillars, according to the process of the present invention.

The process of the present invention provides a method for fabricating high aspect ratio support structures to function as spacers 18. Referring to FIG. 2, there is illustrated a schematic diagram of a stereographic printing apparatus 30 having a display electrode 21 disposed thereon, according to the process of the present invention. The SLA250 Series 40 is an example of a stereolithographic printing apparatus, available from 3D Systems, of Valencia, Calif.

The stereolithographic printing apparatus 30, generally comprises a light source 31, for directing light 33 of various wavelengths toward a pedestal 32. The pedestal 32 is disposed in a vat or bath 34 of resin. A workpiece is disposed on the top portion of the pedestal 32. The height of the pedestal 32 is adjustable, thereby enabling adjustment of the depth of resin covering the workpiece.

In the present invention, a display electrode 16 or 21, is disposed superjacent the pedestal 32. In the case of a field emission display, the preferred embodiment uses the baseplate 21 because the phosphors coating the anode screen 16 tend to be more sensitive to processing damage.

The electrode plate 21 is placed in a vat 34 containing a resin. For use in the present invention, the resin is the material 18' is at least one of a liquid plastic resin, or silicate (glass) beads. The glass beads have a diameter in the approximate range of 20 μm–35 μm.

The size of the glass beads is important with respect to field emitter displays of the type illustrated in FIG. 1. If the glass beads are smaller than the space between the cathode emitter 13 and the grid 15, a layer of oxide passivation may be required to fill in the cathode to gate space, thereby preventing the glass beads from obstructing the operation of the emitters 13.

The resin 18' is used to form the spacer support structures 18 of the present invention. The resin 18' forms a very thin layer superjacent the baseplate 21. The depth of the layer is determined by the strength of the laser 31, and represents the height of the column support structure 18. Hence, if a taller spacer 18 is desired, the process is repeated.

The laser 31 is programmed to direct light or other radiant energy 33 toward the display electrode 21. The radiant energy 33 is at least one of ultra-violet light or visible light in the wavelength of 350 nm. The laser 31 is pulsed or otherwise selectively directed to emit light energy 33 at the baseplate 21 in a pattern. The pattern represents the location of the micro-pillar spacer supports 18.

The pattern is very accurately achieved due to the accuracy of the laser 31. Since, the pattern is programmed on a computer it is repeatable time after time, thereby overcoming the limitations of those processes which require manual alignment of the spacers 18.

The resin material 18' is sensitive to the light energy 33, and hardens or cures wherever the light energy 33 impinges upon it. The height of the columnar support 18 can be increased by lowering the pedestal 32 deeper into the vat 34, and repeating the above described process. The next layer of material 18' covers not only the surface of the baseplate 21, but also blankets the spacer structures 18 being formed.

The laser 31 is directed in substantially the same pattern, thereby solidifying the next layer of material superjacent the spacers 18. As a result, the height of the micro-pillar spacer 18 increases accordingly. If a taller column 18 is desired, the process of is again repeated.

After the micro-pillar structures 18 have been completed, the baseplate 21 and the anode plate 16 are attached and sealed, and a vacuum is created in the space between them. The spacer structures 18 of the present invention, prevent implosion of the electrode plates upon each other.

All of the U.S. Patents cited herein are hereby incorporated by reference herein as if set forth in their entirety.

While the particular process as herein shown and disclosed in detail is fully capable of obtaining the objects and advantages herein before stated, it is to be understood that it is merely illustrative of the presently preferred embodiments of the invention and that no limitations are intended to the details of construction or design herein shown other than as described in the appended claims.

For example, although the support structures of the present invention were discussed with respect to field emitter displays, the spacers of the present invention can be used in other evacuated flat panel displays, such as liquid crystal displays, plasma displays, electro-luminescent displays, vacuum fluorescent displays, flat CRT displays, and other displays employing a pressure differential from outside of the display with respect to the inside of the display which requires support to prevent implosion.

What is claimed is:

1. A method for fabricating columnar supports used for an evacuated display, said method comprising the following steps:

covering an electrode plate with a layer of material having a depth, said material for forming said columnar supports, said depth of said layer representing the height of said columnar supports; and selectively irradiating said material with light energy in a pattern causing said material to harden, said hardened material comprising said columnar supports.

2. The method for fabricating columnar supports used for an evacuated display, according to claim 1, further comprising the steps of:

covering said electrode plate and said hardened material with another layer of said material; and selectively irradiating said another layer of material with light energy in substantially the same said pattern causing said irradiated material to harden, thereby increasing the height of said columnar supports.

3. The method for fabricating columnar supports used for an evacuated display, according to claim 2, wherein said process is repeated until said columnar supports attain a desired height.

4. The method for fabricating columnar supports used for an evacuated display, according to claim 3, wherein said pattern corresponds to locations of said columnar supports.

5. The method for fabricating columnar supports used for an evacuated display, according to claim 4, wherein said material comprises a dielectric, said dielectric being sensitive to said light energy.

6. The method for fabricating columnar supports used for an evacuated display, according to claim 5, wherein said light energy has a wavelength of approximately 350 nm.

7. A method for fabricating micro-pillars useful in evacuated displays, said method comprising the following steps of:

disposing a display plate in a bath, said baseplate having a top surface, said bath comprising pillar material, said pillar material covering said top surface of said display plate; and pulsing radiant energy toward said top surface of said display plate in a pattern, said radiant energy hardening said pillar material impacted thereby.

8. The method for fabricating micro-pillars useful in evacuated displays, according to claim 7, further comprising the steps of:

lowering said baseplate deeper into said bath such that said pillar material covers said hardened pillar material; and pulsing said radiant energy toward said top surface of said display plate in substantially the same said pattern, said radiant energy hardening said pillar material impacted thereby.

9. The method for fabricating micro-pillars useful in evacuated displays, according to claim 8, wherein said pillar material comprises at least one of glass beads, a liquid plastic, and a resin.

10. The method for fabricating micro-pillars useful in evacuated displays, according to claim 9, wherein said radiant energy comprises at least one of ultra-violet light and laser light.

11. The method for fabricating micro-pillars useful in evacuated displays, according to claim 10, wherein said pattern is programmed into said laser.

12. The method for fabricating micro-pillars useful in evacuated displays, according to claim 11, wherein said micropillar has a diameter substantially in the range of 20 μm–30 μm.

13. The method for fabricating micro-pillars useful in evacuated displays, according to claim 12, wherein said display plate comprises at least one of an anode screen and a baseplate.

14. A method of forming inter-electrode spacers useful for flat panel display devices, said method comprising the following steps of:

placing a display electrode on a pedestal, said pedestal being disposed in a vat of glass beads, a layer of glass beads blankets said display electrode; and directing laser energy toward said display electrode, said glass beads adhering to said baseplate as a result of said laser energy.

15. The method of forming inter-electrode spacers useful for flat panel display devices, according to claim 14, wherein said laser energy is directed toward said display electrode in a pattern, said patterning representing locations where said spacers are formed.

16. The method of forming inter-electrode spacers useful for flat panel display devices, according to claim 15, wherein a squeegee is used to disperse said glass beads in a substantial uniform layer across said display electrode.

17. The method of forming inter-electrode spacers useful for flat panel display devices, according to claim 16, wherein said pedestal is lowered deeper into said vat and said process is repeated.

18. The method of forming inter-electrode spacers useful for flat panel display devices, according to claim 17, wherein said glass beads have a diameter in the approximate range of 20–35 μm.

19. The method of forming inter-electrode spacers useful for flat panel display devices, according to claim 18, wherein said display electrode comprises at least one of an anode screen and a baseplate.

20. The method of forming inter-electrode spacers useful for flat panel display devices, according to claim 19, wherein said display is a field emission display.

* * * * *